United States Patent
Li

(10) Patent No.: US 9,813,332 B2
(45) Date of Patent: Nov. 7, 2017

(54) METHOD, DEVICE AND SYSTEM FOR ESTABLISHING LABEL SWITCHED PATH

(71) Applicant: Huawei Technologies Co., Ltd., Shenzhen (CN)

(72) Inventor: Zhenbin Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 151 days.

(21) Appl. No.: 14/859,205

(22) Filed: Sep. 18, 2015

(65) Prior Publication Data

US 2016/0014021 A1    Jan. 14, 2016

Related U.S. Application Data

(63) Continuation of application No. PCT/CN2013/090643, filed on Dec. 27, 2013.

(30) Foreign Application Priority Data

May 10, 2013    (CN) .......................... 2013 1 0173273

(51) Int. Cl.
 *H04L 12/723* (2013.01)
 *H04L 12/873* (2013.01)
 *H04L 12/863* (2013.01)

(52) U.S. Cl.
 CPC ............ *H04L 45/50* (2013.01); *H04L 45/507* (2013.01); *H04L 47/50* (2013.01)

(58) Field of Classification Search
 CPC ........ H04L 45/50; H04L 45/507; H04L 47/50
 See application file for complete search history.

(56) References Cited

U.S. PATENT DOCUMENTS

| 7,936,780 | B1 | 5/2011 | Kompella | |
| 9,331,948 | B2 * | 5/2016 | Venekataswami | ...... H04L 47/24 |
| 2012/0099538 | A1 * | 4/2012 | Venkataswami | .... H04W 76/022 |
| | | | | 370/329 |

FOREIGN PATENT DOCUMENTS

| CN | 101478474 A | 7/2009 |
| CN | 102045236 A | 5/2011 |
| CN | 102439919 A | 5/2012 |

(Continued)

OTHER PUBLICATIONS

IETF RFC 5150, Ayyangar et al., Feb. 2008 (a copy is provided by Applicant, see IDS filed on Mar. 25, 2016).*

(Continued)

*Primary Examiner* — Jianye Wu
(74) *Attorney, Agent, or Firm* — Leydig, Voit & Mayer, Ltd.

(57) ABSTRACT

The present application discloses a method, a device and a system for establishing an LSP. The method includes: allocating, by a proxy node device, a label for a destination node device, generating a label mapping message carrying the label, an address of the destination node device and an address of the proxy node device, and sending the label mapping message to an upstream node device to initiate establishment of a first LSP from an entry node device to the proxy node device; stitching, by the proxy node device, the first LSP with a second LSP to form a third LSP from the entry node device to the destination node device, where the second LSP is an LSP established between the proxy node device and the destination node device.

18 Claims, 10 Drawing Sheets

(56) References Cited

FOREIGN PATENT DOCUMENTS

EP         2950487 A1   12/2015
WO    WO 2012031217 A1   3/2012

OTHER PUBLICATIONS

Rekhter et al., "Carrying Label Information in BGP-4," Network Working Group, Request for comments: 3107, pp. 1-8, Internet Society, Reston, Virginia (May 2001).
Andersson et al., "LDP Specification," Network Working Group, Request for Comments: 3036, The Internet Society, Reston, Virginia (Jan. 2001).
Andersoson et al., "LDP Specification," Network Working Group, Request for Comments: 5036, The Internet Society, Reston, Virginia (Oct. 2007).
Ayyangar et al., "Label Switched Path Stitching with Generalized Multiprotocol Label Switching Traffic Engineering (GMPLS TE)," Network Working Group, Request for Comments: 5150, The IETF Trust (Feb. 2008).
Bahadur et al., "Mechanism for Performing Label Switched Path Ping (LSP Ping) over MPLS Tunnels," Internet Engineering Task Force (IETF), Request for Comments: 6424, IETF Trust, Reston, Virginia (Nov. 2011).
Leymann et al., "Seamless MPLS Architecture," MPLS Working Group, Internet-Draft, IETF Trust, Reston, Virginia (Oct. 22, 2012).
Li et al., "Applicability of LDP Multi-Topology for Unicast Fast-reroute Using Maximally Redundant Trees," Network Working Group, Internet-Draft, IETF Trust, Reston, Virginia (Apr. 26, 2013).
Li et al., "Proxy MPLS Traffic Engineering Label Switched Path (LSP)," Network Working Group, Internet-Draft, IETF Trust, Reston, Virginia (Jul. 8, 2013).

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   Prefix type    |      Address family      |Prefix Length |
|   (Prefix Type)  |      (Address Family)    |   (PreLen)   |
+-+-+-+-+-+-+-+-+-+-+-+-+-+-+-+-+-+-+-+-+-+-+-+-+-+-+-+-+-+-+-+-+
|          Destination Node Address (Destination Node Address)   |
+-+-+-+-+-+-+-+-+-+-+-+-+-+-+-+-+-+-+-+-+-+-+-+-+-+-+-+-+-+-+-+-+
|              Proxy Node Address (Proxy Node Address)           |
+-+-+-+-+-+-+-+-+-+-+-+-+-+-+-+-+-+-+-+-+-+-+-+-+-+-+-+-+-+-+-+-+
|     Multi-topology ID (MT ID)    |     Reserved   (Reserved)   |
+-+-+-+-+-+-+-+-+-+-+-+-+-+-+-+-+-+-+-+-+-+-+-+-+-+-+-+-+-+-+-+-+
```

FIG. 3

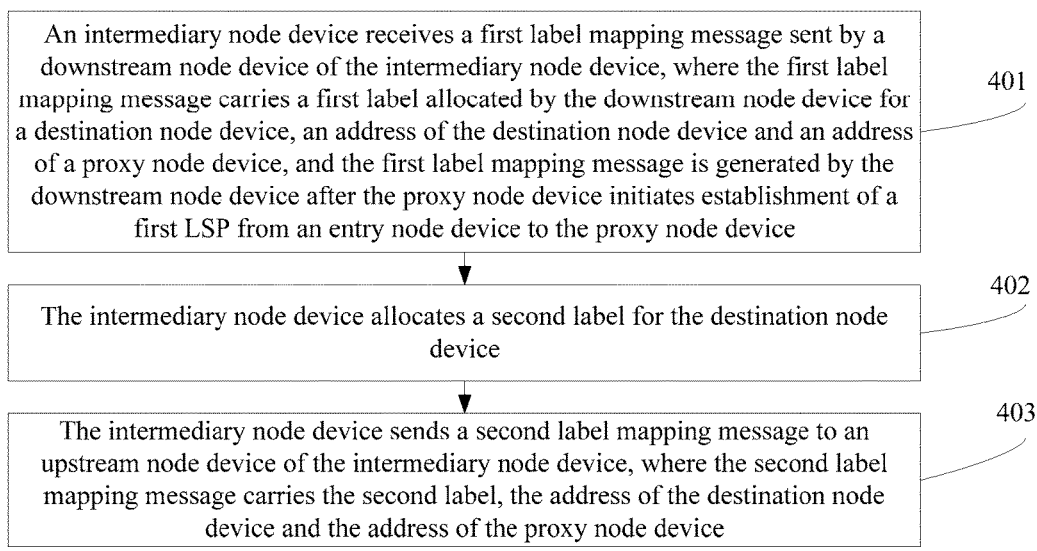

FIG. 4

An entry node device receives a label mapping message sent by a downstream node device of the entry node device, where the label mapping message carries a label allocated by the downstream node device for a destination node device, an address of a proxy node device and an address of the destination node device, and the label mapping message is generated by the downstream node device after the proxy node device initiates establishment of a first LSP from the entry node device to the proxy node device

501

The entry node device establishes the first LSP from the entry node device to the proxy node device according to the address of the proxy node device, and establishes a label forwarding table entry, where the label forwarding table entry includes: the label, the address of the proxy node device and the address of the destination node device

```
    0                   1                   2                   3
    0 1 2 3 4 5 6 7 8 9 0 1 2 3 4 5 6 7 8 9 0 1 2 3 4 5 6 7 8 9 0 1
   +-+-+-+-+-+-+-+-+-+-+-+-+-+-+-+-+-+-+-+-+-+-+-+-+-+-+-+-+-+-+-+-+
   |        Type (Type)            |        Length (Length)        |
   +-+-+-+-+-+-+-+-+-+-+-+-+-+-+-+-+-+-+-+-+-+-+-+-+-+-+-+-+-+-+-+-+
   |                    IPv4 address ( IPv4 address)               |
   +-+-+-+-+-+-+-+-+-+-+-+-+-+-+-+-+-+-+-+-+-+-+-+-+-+-+-+-+-+-+-+-+
```

FIG. 6

The entry node device detects whether it is possible to reach the destination node device via the third LSP

701

Yes / No

The entry node device uses the third LSP to bear a service packet sent to the destination node device

702

The entry node device prohibits the third LSP from bearing the service message sent to the destination node device

METHOD, DEVICE AND SYSTEM FOR ESTABLISHING LABEL SWITCHED PATH

CROSS-REFERENCE TO RELATED APPLICATIONS

This application is a continuation of International Patent Application No. PCT/CN2013/090643, filed on Dec. 27, 2013, which claims priority to Chinese Patent Application No. 201310173273.1, filed on May 10, 2013, both of which are hereby incorporated by reference in their entireties.

TECHNICAL FIELD

Embodiments of the present invention relate to communications technologies and, in particular, to a method, a device and a system for establishing a label switched path (Label Switched Path, LSP).

BACKGROUND

As shown in FIG. 1, in a carrier's carrier (carrier's carrier) solution in the prior art, an internal gateway protocol (Internal Gateway Protocol, IGP)+a label distribution protocol (Label Distribution Protocol, LDP) are utilized between a customer equipment (Customer Edge, CE) of a backbone carrier and a provider edge equipment (Provider Edge, PE) of the backbone carrier. PEs inside the backbone carrier use a boarder gateway protocol (Border Gateway Protocol, BGP) to advertise a route and a label of a customer carrier. A PE equipment of a customer carrier, which is a customer carrier provider edge equipment (customer provider edge, C-PE) in FIG. 1, needs to establish a label switched path (Label Switched Path, LSP) from a C-PE2 of an upstream second customer carrier to a C-PE1 of a downstream first customer carrier in order to be able to provide its customer with a virtual private network (Virtual Private Network, VPN) service.

IGP+LDP protocols run in an internal network of the backbone carrier and run between a customer equipment CE1 and a PE1 equipment of the backbone carrier. On the PE1 equipment, both protocols belong to a virtual routing and forwarding (Virtual Routing and Forwarding, VRF). An LSP from the PE1 to the C-PE1 is established via the LDP. The PE1 learns a route to the C-PE1 via the IGP.

In a VRF instance on the PE1 equipment of the backbone carrier, the IGP route in the VRF instance is introduced into the BGP VPN, which uses the BGP to advertise a route (a route from the CE1 to the C-PE1) of the customer carrier to a PE2 equipment of a remote backbone carrier. When advertising a private network route, the BGP allocates a label for each route in a per-route per-label method and advertises a route together with the label allocated for the route to the PE2 equipment via the BGP. The PE1 takes a label of the route allocated by the CE1 for the PE1 via the LDP and the PE1 locally. A multi-protocol label switching (Multi-Protocol Label Switching, MPLS) is a technique used for fast packet switching and routing, it provides network traffic with capabilities such as targeting, routing, forwarding, switching and etc. In the MPLS, data transmission occurs on an LSP, reasonable establishment of the LSP can greatly reduce cooperation between different network layers when services are deployed, thereby improving a forwarding speed. Thus, how to establish the LSP reasonably is critical for a carrier to quickly provide services and lowers service deployment costs.

Seamless (Seamless) MPLS networking refers to a networking manner that all internet protocol (Internet Protocol, IP) devices managed by carriers, including access network devices, convergence network devices and backbone network devices, form a unified IP/MPLS control plane. Currently, in a solution of an IP radio access network (Radio Access Network, RAN) based on the seamless MPLS, when an access network integrates with the IP backbone network, the access network stitches (Stitch) with a border gateway protocol (Border Gateway Protocol, BGP) LSP established by the IP backbone network mainly via an LSP established by the label distribution protocol (Label Distribution Protocol, LDP), thereby completing an integration of the access network of the IP RAN with the IP backbone network. During this process, a node device in the access network needs to statically configure a route reaching a BGP LSP destination device in the IP backbone network; the static configuration of the route is complicated, which thereby increases difficulty of maintenance and management of node devices.

SUMMARY

Embodiments of the present invention provide a method, a device and a system for establishing an LSP, which are used to solve problems of complicated configuration as well as difficult management and maintenance due to a need of static routing configuration when LSPs of different protocols are stitched in the prior art.

In a first aspect, a method for establishing an LSP is provided, and the method includes:

allocating, by a proxy node device, a label for a destination node device;

generating, by the proxy node device, a label mapping message, where the label mapping message carries the label, an address of the destination node device and an address of the proxy node device;

sending, by the proxy node device, the label mapping message to an upstream node device of the proxy node device to initiate establishment of a first LSP from an entry node device to the proxy node device; and stitching, by the proxy node device, the first LSP with a second LSP to form a third LSP from the entry node device to the destination node device, wherein the second LSP is an LSP established between the proxy node device and the destination node device, and the first LSP and the second LSP are LSPs of different protocol types.

According to the first aspect, a first possible implementation mode of the first aspect is further provided. In the first possible implementation mode of the first aspect, before the allocating, by a proxy node device, a label for a destination node device, the method further includes:

receiving, a label request message sent by the upstream node, where the label request message carries the address of the destination node device and the address of the proxy node device.

According to the first aspect or the first possible implementation mode of the first aspect, a second possible implementation mode of the first aspect is further provided. In the second possible implementation mode of the first aspect, the label mapping message further carries a topology identification (ID) to enable the first LSP to be established in a network topology corresponding to the topology ID.

According to the first aspect or any one of the above possible implementation modes of the first aspect, a third possible implementation mode of the first aspect is further provided. In the third possible implementation mode of the first aspect, the label mapping message is a label distribution protocol LDP label mapping message, and the address of the destination node device and the address of the proxy node device are carried by extending a prefix forwarding equivalence class element (Prefix FEC Element) of the label mapping message.

According to the first aspect or any one of the above possible implementation modes of the first aspect, a fourth possible implementation mode of the first aspect is further provided. In the fourth possible implementation mode of the first aspect, the allocating, by a proxy node device, a label for a destination node device includes:

matching, by the proxy node device, a routing table according to the address of the destination node device, and allocating the label when a route reaching the destination node device is matched.

In a second aspect, a method for establishing an LSP is provided, where the method includes:

receiving, by an intermediary node device, a first label mapping message sent by a downstream node device of the intermediary node device, where the first label mapping message carries a first label allocated by the downstream node device for a destination node device, an address of the destination node device and an address of a proxy node device, and the first label mapping message is generated by the downstream node device after the proxy node device initiates establishment of a first LSP from an entry node device to the proxy node device;

allocating, by the intermediary node device, a second label for the destination node device; and sending, by the intermediary node device, a second label mapping message to an upstream node device of the intermediary node device, where the second label mapping message carries the second label, the address of the destination node device and the address of the proxy node device.

According to the second aspect, a first possible implementation mode of the second aspect is further provided. In the first possible implementation mode of the second aspect, the allocating, by the intermediary node device, a second label for the destination node device includes:

matching, by the intermediary node device, a routing table according to the address of the proxy node device, allocating the second label when a route reaching the proxy node device is matched, and establishing a label forwarding table corresponding to the second label, where the label forwarding table includes: the address of the proxy node device, the address of the destination node device, the first label and the second label.

According to the second aspect or the first possible implementation mode of the second aspect, a second possible implementation mode of the second aspect is further provided, where before the intermediary node device receives the first label mapping message sent by the downstream node device of the intermediary node device, the method further includes:

receiving, a first label request message sent by the upstream node device of the intermediary node device, where the first label request message carries the address of the destination node device and the address of the proxy node device; and sending, a second label request message to the downstream node device of the intermediary node device, where the second label request message carries the address of the destination node device and the address of the proxy node device.

According to the second aspect or any one of the possible implementation modes of the second aspect described above, a third possible implementation mode of the second aspect is further provided. In the third possible implementation of the second aspect, the first label mapping message and the second label mapping message are label distribution protocol LDP label mapping messages, the address of the destination node device and the address of the proxy node device are carried by extending prefix forwarding equivalence class elements Prefix FEC Elements of the first label mapping message and the second label mapping message.

According to the second possible implementation mode of the second aspect or the third possible implementation mode of the second aspect, a fourth possible implementation mode of the second aspect is further provided. In the fourth possible implementation mode of the second aspect, the first label request message and the second label request message are LDP label request messages, the address of the destination node device and the address of the proxy node device are carried by extending Prefix FEC Elements of the first label request message and the second label request message.

In a third aspect, a method for establishing an LSP is provided, where the method includes:

receiving, by an entry node device, a label mapping message sent by a downstream node device of the entry node device, where the label mapping message carries a label allocated by the downstream node device for a destination node device, an address of a proxy node device and an address of the destination node device, and the label mapping message is generated by the downstream node device after the proxy node device initiates establishment of an LSP from the entry node device to the proxy node device; and establishing, by the entry node device, the LSP from the entry node device to the proxy node device according to the address of the proxy node device, and establishing a label forwarding table, where the label forwarding table includes: the label, the address of the proxy node device and the address of the destination node device.

According to the third aspect, a first possible implementation mode of the third aspect is further provided. In the first possible implementation mode of the third aspect, before the entry node device receives the label mapping message sent by the downstream node device of the entry node device, the method further includes:

sending, by the entry node device, a label request message to the downstream node device, where the label request message carries the address of the destination node device and the address of the proxy node device.

According to the third aspect or the first possible implementation mode of the third aspect, a second possible implementation mode of the third aspect is further provided. In the second possible implementation mode of the third aspect, the label mapping message is a label distribution protocol LDP label mapping message, the address of the destination node device and the address of the proxy node device are carried by extending a prefix forwarding equivalence class element Prefix FEC Element of the label mapping message.

According to the third aspect or any one of the possible implementation modes of the third aspect described above, a third possible implementation mode of the third aspect is further provided. In the third possible implementation mode of the third aspect, the label request message is an LDP label request message, and the address of the destination node device and the address of the proxy node device are carried by extending a Prefix FEC Element of the label request message.

According to the third aspect or any one of the possible implementation modes of the third aspect described above, a fourth possible implementation mode of the third aspect is further provided. In the fourth possible implementation mode of the third aspect, the label mapping message further carries a topology identification ID to enable the first LSP to be established in a network topology corresponding to the topology ID.

In a fourth aspect, a proxy node device for establishing an LSP is provided, where the proxy node device includes:

an allocating unit, configured to allocate a label for a destination node device;

a generating unit, configured to generate a label mapping message, where the label mapping message carries the label, an address of the destination node device and an address of the proxy node device;

a sending unit, configured to send the label mapping message to an upstream node device of the proxy node device to initiate establishment of a first LSP from an entry node device to the proxy node device; and a stitching unit, configured to stitch the first LSP with a second LSP to form a third LSP from the entry node device to the destination node device, where the second LSP is an LSP established between the proxy node device and the destination node device, and the first LSP and the second LSP are LSPs of different protocol types.

According to the fourth aspect, a first possible implementation mode of the fourth aspect is further provided. In the first possible implementation mode of the fourth aspect, the proxy node device further includes:

a receiving unit, configured to receive a label request message sent by the upstream node before the allocating unit allocates the label for the destination node device, where the label request message carries the address of the destination node device and the address of the proxy node device.

In a fifth aspect, an intermediary node device for establishing an LSP is provided, where the intermediary node device includes:

a first receiving unit, configured to receive a first label mapping message sent by a downstream node device of the intermediary node device, where the first label mapping message carries a first label allocated by the downstream node device for a destination node device, an address of the destination node device and an address of a proxy node device, and the first label mapping message is generated by the downstream node device after the proxy node device initiates establishment of a first LSP from an entry node device to the proxy node device;

an allocating unit, configured to allocate a second label for the destination node device; and a first sending unit, configured to send a second label mapping message to an upstream node device of the intermediary node device, where the second label mapping message carries the second label, the address of the destination node device and the address of the proxy node device.

According to the fifth aspect, a first possible implementation mode of the fifth aspect is further provided. In the first possible implementation mode of the fifth aspect, the intermediary node device further includes:

a second receiving unit, configured to receive a first label request message sent by the upstream node device of the intermediary node device before the first receiving unit receives the first label mapping message sent by the downstream node device of the intermediary node device, where the first label request message carries the address of the destination node device and the address of the proxy node device; and a second sending unit, configured to send a second label request message to the downstream node device of the intermediary node device, where the second label request message carries the address of the destination node device and the address of the proxy node device.

In a sixth aspect, an entry node device for establishing an LSP is provided, where the entry node device includes:

a receiving unit, configured to receive a label mapping message sent by a downstream node device of the entry node device, where the label mapping message carries a label allocated by the downstream node device for a destination node device, an address of a proxy node device and an address of the destination node device, and the label mapping message is generated by the downstream node device after the proxy node device initiates establishment of an LSP from the entry node device to the proxy node device; and an establishing unit, configured to establish the LSP from the entry node device to the proxy node device according to the address of the proxy node device, and establish a label forwarding table, where the label forwarding table includes the label, the address of the proxy node device and the address of the destination node device.

According to the sixth aspect, a first possible implementation mode of the sixth aspect is further provided. In the first possible implementation mode of the sixth aspect, the entry node device further includes:

a sending unit, configured to send a label request message to the downstream node device before the receiving unit receives the label mapping message sent by the downstream node device of the entry node device, where the label request message carries the address of the destination node device and the address of the proxy node device.

In a seventh aspect, a system for establishing an LSP is provided, where the system includes: a proxy node device, an intermediary node device and an entry node device, and where, the proxy node device is configured to allocate a first label for a destination node device, send the first label mapping message to the intermediary node device to initiate establishment of a first LSP from the entry node device to the proxy node device, where the first label mapping message carries the first label, an address of the destination node device and an address of the proxy node device;

the intermediary node device is configured to receive the first label mapping message, and allocate a second label for the destination node device, and send a second label mapping message including the second label, the address of the destination node device and the address of the proxy node device to the entry node device;

the entry node device is configured to receive the second label mapping message, and establish the first LSP according to the address of the proxy node device; and the proxy node device is further configured to stitch the first LSP with a second LSP to form a third LSP from the entry node device to the destination node device, where the second LSP is an LSP established between the proxy node device and the destination node device, and the first LSP and the second LSP are LSPs of different protocol types.

According to the seventh aspect, a first possible implementation mode of the seventh aspect is further provided. In the first possible implementation mode of the seventh aspect, the entry node device is further configured to send a first label request message to the intermediary node device before the proxy node device sends the first label mapping message to the intermediary node device, where the label request message carries the address of the destination node device and the address of the proxy node device;

the intermediary node device is further configured to receive the first label request message sent by the entry node device, and send a second label request message to the destination node device, where the second label request message carries the address of the proxy node device and the address of the destination node device; and the proxy node device is further configured to receive the second label request message sent by the intermediary node device.

Through technical solutions in the embodiments of the present invention, a proxy node device allocates a label for a destination node device, and generates a label mapping message including the label to initiate establishment of an LSP from an entry node device to the proxy node device, where the label mapping message further includes an address of the destination node device and an address of the proxy node device, in this way, an intermediary node device between the proxy node device and the entry node device may establish the first LSP via the address of the proxy node device, the proxy node device stitches the first LSP with a second LSP to form the third LSP from the entry node device to the destination node device, during this process, there is no need for the entry node device and the intermediate node device to pre-configure a static route reaching the destination node device, which solves problems of complicated configuration as well as difficult management and maintenance due to a need to configure the static route when LSPs of different protocols are stitched in the prior art.

BRIEF DESCRIPTION OF DRAWINGS

In order to make technical solutions of embodiments of the present invention more clearly, accompanying drawings used for description of the embodiments will be briefly described hereunder. Obviously, the described drawings are merely some embodiments of present invention. For persons skilled in the art, other drawings may be obtained based on these drawings without any creative efforts.

FIG. 3 is a schematic diagram of another Prefix FEC Element provided by an embodiment of the present invention;

FIG. 4 is a flow chart of a second method for establishing an LSP provided by an embodiment of the present invention;

FIG. 5 is a flow chart of a third method for establishing an LSP provided by an embodiment of the present invention;

FIG. 6 is a schematic diagram of a TLV provided by an embodiment of the present invention;

FIG. 7 is a flow chart of a method for detecting a third LSP provided by an embodiment of the present invention;

DESCRIPTION OF EMBODIMENTS

In order to make objectives, technical solutions, and advantages of embodiments of the present invention clearer, the technical solutions in embodiments of the present invention are hereinafter described clearly with reference to accompanying drawings in embodiments of the present invention. Obviously, the described embodiments are only a part of embodiments of the present invention, rather than all embodiments of the present invention. All other embodiments obtained by persons of ordinary skill in the art based on embodiments of the present invention without any creative efforts shall fall within the protection scope of the present invention.

Figure 1:
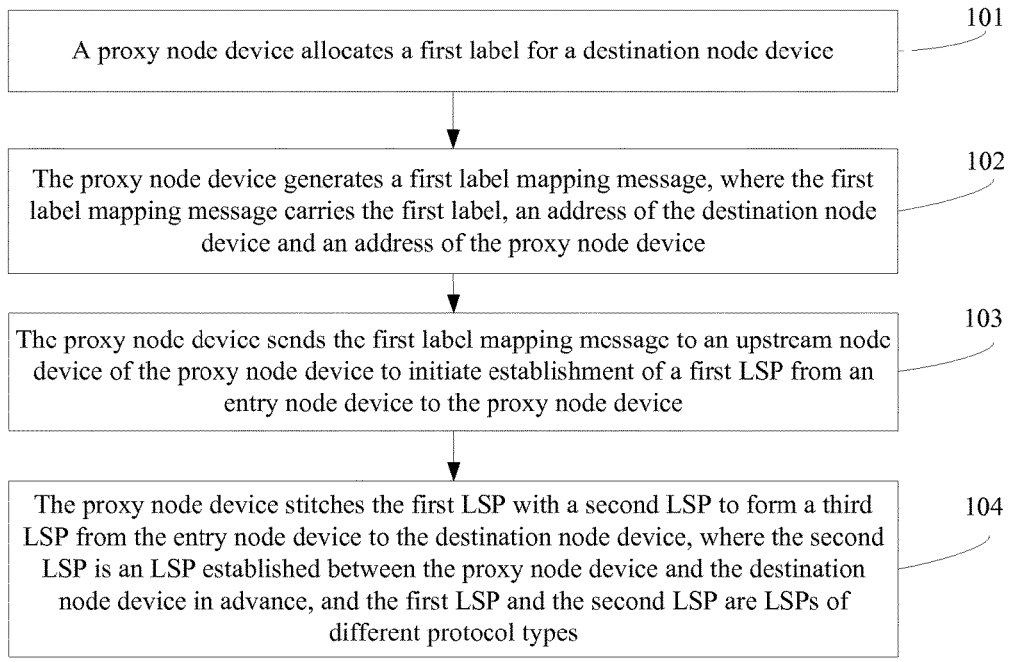
FIG. 1 is a flow chart of a first method for establishing an LSP provided by an embodiment of the present invention.

Referring to FIG. 1, this embodiment provides a method for establishing an LSP, and the method includes the following contents.

101, a proxy node device allocates a first label for a destination node device.

102, the proxy node device generates a first label mapping message, where the first label mapping message carries the first label, an address of the destination node device and an address of the proxy node device.

103, the proxy node device sends the first label mapping message to an upstream node device of the proxy node device to initiate establishment of a first LSP from an entry node device to the proxy node device. When there is an intermediary node device on a path between the proxy node device and the entry node device, each of the intermediary node device allocates a second label for the destination node device, and sends a second label mapping message including the second label, the address of the destination node device and the address of the proxy node device to an upstream node device of the intermediary node device, so that the entry node device establishes the first LSP according to the address of the proxy node device.

104, the proxy node device stitches the first LSP with a second LSP to form a third LSP from the entry node device to the destination node device, where the second LSP is an LSP established between the proxy node device and the destination node device, and the first LSP and the second LSP are LSPs of different protocol types.

Optionally, the first LSP may be established by using an LDP downstream unsolicited (Downstream Unsolicited, DU) label distributing mode. Correspondingly, the first label mapping message is an LDP label mapping message.

Optionally, the first LSP may be established through a downstream on demand (Downstream on Demand, DoD) label distributing mode. Before the proxy node device allocates the first label for the destination node device, the method further includes:

receiving a label request message sent by the upstream node, where the label request message carries the address of the destination node device and the address of the proxy node device. The label request message is used to request for establishment of the first LSP from the entry node device to the proxy node device. After receiving the label request message, the proxy node device generates the first label mapping message, and sends the first label mapping message to the upstream node device of the proxy node device.

Figure 2:
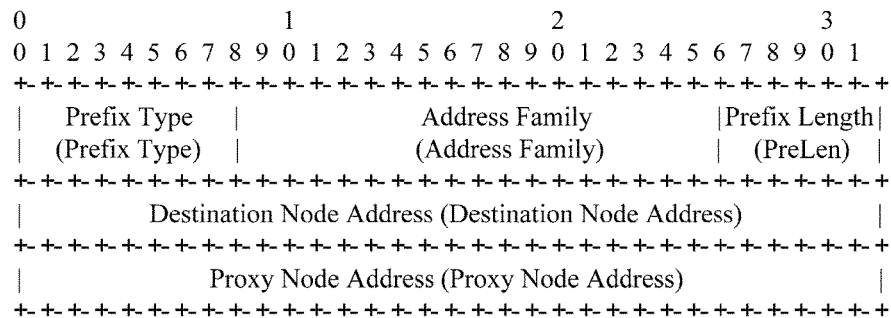
FIG. 2 is a schematic diagram of a Prefix FEC Element provided by an embodiment of the present invention.

Optionally, the address of the destination node device and the address of the proxy node device may be carried by extending a Prefix FEC Element of the first label mapping message. Referring to FIG. 2 which is a schematic diagram of a newly extended Prefix FEC element, in which:

a prefix type (Prefix Type) is used to identify a type of the extended Prefix FEC Element, and a value thereof may be 3;

an address family (Address Family) is used to identify an address family type corresponding to the Prefix FEC Element;

a destination node device address (Destination Node Address) is used to identify the address of the destination node device carried by the Prefix FEC Element;

a prefix length (PreLen) is used to identify a length of the address of the destination node device carried by the Prefix FEC Element;

a proxy node address (Proxy Node Address) field is used to identify the address of the proxy node device carried by the Prefix FEC Element.

Optionally, the second label mapping message carries the address of the destination node device and the address of the proxy node device by extending the Prefix FEC element via a mode as shown in FIG. 2.

Optionally, the first label mapping message further carries a topology ID to enable the first LSP to be established in a network topology corresponding to the topology ID. A multi-topology technology refers to virtualization of multiple logical topology networks in a physical topology network, and by carrying a topology ID in the first label mapping message, the first LSP is enabled to be established in a logical topology network corresponding to the topology ID. The first label mapping message may carry the topology ID by extending the Prefix FEC Element, a topology ID field is added based on the extension of the FEC Element as shown in FIG. 2, referring to FIG. 3 for details, where:

A multi-topology (Multi-topology) ID (MT-Id) is used to identify a topology ID carried by the Prefix FEC Element.

Reserved (Reserved) is used to reserve for future extension.

Optionally, the second label mapping message carries the topology ID through an extending mode as shown in FIG. 3.

Optionally, the second LSP may be a boarder gateway protocol (Boarder Gateway Protocol, BGP) LSP or a resource reservation protocol traffic engineering (Resource Reservation Protocol Traffic Engineering, RSVP TE) LSP.

Optionally, the proxy node device allocating the first label for the destination node device, includes:

the proxy node device matches a routing table according to the address of the destination node device, and allocates the first label when a matching route to the destination node device is found.

Optionally, the proxy node device stitching the first LSP with a second LSP, includes: when the first LSP is established, after the proxy node device allocates the first label for the upstream node of the proxy node device, the proxy node device establishes a label forwarding table (Label Forwarding Information Base, LFIB) including the first label and the third label, where the third label corresponds to the second LSP, and the third label is allocated by a downstream node of the proxy node device for the destination node device when the second LSP is established. When receiving a packet with an entry label being the first label, the proxy node device replaces the label of the packet with the third label according to the label forwarding table, and then sends the packet to the destination node device via the second LSP.

Through technical solutions in embodiments of the present invention, the proxy node device generates the first label mapping message to initiate establishment of a first LSP from the entry node device to the proxy node device, where the first label mapping message includes an address of the destination node device and an address of the proxy node device, and in this way, an intermediary node device between the proxy node device and the entry node device may establish the first LSP via the address of the proxy node device; the proxy node device stitches the first LSP with a second LSP to form the third LSP from the entry node device to the destination node device, during this process, there is no need for the entry node device and the intermediate node device to pre-configure a static route reaching the destination node device, which solves problems of complicated configuration as well as difficult management and maintenance due to a need to configure the static route when LSPs of different protocols are stitched in the prior art.

Referring to FIG. 4, an embodiment of the present invention further provides a second method for establishing an LSP, and the method includes the following contents.

401, an intermediary node device receives a first label mapping message sent by a downstream node device of the intermediary node device, where the first label mapping message carries a first label allocated by the downstream node device for a destination node device, an address of the destination node device and an address of a proxy node device, and the first label mapping message is generated by the downstream node device after the proxy node device initiates stabling a first LSP from an entry node device to the proxy node device.

402, the intermediary node device allocates a second label for the destination node device.

403, the intermediary node device sends a second label mapping message to an upstream node device of the intermediary node device, where the second label mapping message carries the second label, the address of the destination node device and the address of the proxy node device. The entry node device is triggered to establish the first LSP from the entry node device to the proxy node device, so that the proxy node device stitches the first LSP with a second LSP to form an end-to-end third LSP from the entry node device to the destination node device, where the second LSP is an LSP established between the proxy node device and the destination node device.

Optionally, the intermediary node device allocating the second label for the destination node device, includes:

the intermediary node device matches a routing table according to the address of the proxy node device, allocates the second label when a matching route to the proxy node device is found, and establishes a label forwarding table corresponding to the second label, where the label forwarding table includes: the address of the proxy node device, the address of the destination node device, the first label and the second label.

Optionally, the first LSP may be established by using an LDP DU mode. Correspondingly, the first label mapping message and the second label mapping message are LDP label mapping messages.

Optionally, before the intermediary node device receives the first label mapping message sent by the downstream node device of the intermediary node, further includes:

receiving a first label request message sent by the upstream node device of the intermediary node device, where the first label request message carries the address of the destination node device and the address of the proxy node device;

sending, a second label request message to the downstream node device of the intermediary node device, where the second label request message carries the address of the destination node device and the address of the proxy node device.

The first LSP may be established in a DoD mode. Correspondingly, the first label mapping message may be an LDP label mapping message.

Optionally, the address of the destination node device and the address of the proxy node device may be carried by extending a Prefix FEC Element of the first label mapping message, reference may be made to FIG. 2 for a specific extending mode, which will not be repeated herein.

Optionally, the first label mapping message further carries a topology ID to enable the first LSP to be established in a network topology corresponding to the topology ID. The first label mapping message also carries the topology ID, which may be carried by extending the Prefix FEC Element, reference may be made to FIG. 3 for a specific extending manner, which will not be repeated herein.

Optionally, the second LSP may be a BGP LSP or an RSVP TE LSP.

Optionally, the first label request message and the second label request message are LDP label request messages, the address of the destination node device and the address of the proxy node device are carried by extending Prefix FEC Elements of the first label mapping message and the second label request message, reference may be made to FIG. 2 for a specific extending manner, which will not be repeated herein.

Through technical solutions in the embodiments of the present invention, the intermediary node device receives the first label mapping message carrying the address of the destination node device and the address of the proxy node device, and sends the second label mapping message including the address of the destination node device and the address of the proxy node device to an upstream node device of the intermediary node device, so as to trigger the entry node device to establish the first LSP according to the address of the proxy node device, the proxy node device stitches the first LSP with a second LSP to form the third LSP from the entry node device to the destination node device, and during this process, there is no need for the entry node device and the intermediate node device to pre-configure a static route reaching the destination node device, which solves problems of complicated configuration as well as difficult management and maintenance due to a need to configure the static route when LSPs of different protocols are stitched in the prior art.

Referring to FIG. 5, an embodiment of the present invention provides a third method for establishing an LSP, and the method includes the following contents.

501, an entry node device receives a label mapping message sent by a downstream node device of the entry node device, where the label mapping message carries a label allocated by the downstream node device for a destination node device, an address of a proxy node device and an address of the destination node device, and the label mapping message is generated by the downstream node device after the proxy node device initiates establishing a first LSP from the entry node device to the proxy node device.

502, the entry node device establishes the first LSP from the entry node device to the proxy node device according to the address of the proxy node device, and establishes a label forwarding table, where the label forwarding table includes: the label, the address of the proxy node device and the address of the destination node device.

Optionally, the first LSP may be established by using an LDP DU mode. Correspondingly, the label mapping message is an LDP label mapping message.

Optionally, before the entry node device receives the label mapping message sent by the downstream node device of the entry node device, the method further includes:

The entry node device sends a label request message to the downstream node device, where the label request message carries the address of the destination node device and the address of the proxy node device.

The first LSP may be established in a DoD mode. Correspondingly, the label mapping message may be an LDP label mapping message. The label mapping message is the LDP label mapping message, the address of the destination node device and the address of the proxy node device may be carried by extending a prefix forwarding equivalence class element Prefix FEC Element of the label mapping message, reference may be made to FIG. 2 for a specific extending manner, which will not be repeated herein.

Optionally, the label mapping message further carries a topology identification ID to enable the first LSP to be established in a network topology corresponding to the topology ID. Reference may be made to FIG. 3 for a specific extending manner, which will not be repeated herein.

Optionally, the label request message is an LDP label request message, and the address of the destination node device and the address of the proxy node device are carried by extending a Prefix FEC Element of the label request message. Reference may be made to FIG. 2 for a specific extending manner, which will not be repeated herein.

Optionally, during a network plan, the address of the destination node device and the address of the proxy node device are configured on the entry node, before the entry node device initiates the label request message, the address of the destination node device and the address of the proxy node device which are configured are obtained, and then the label request message including the address of the proxy node device is generated.

Optionally, before initiating the label request message, the entry node device receives a notification message sent by the proxy node device via an interior gateway protocol (Interior Gateway Protocol, IGP), where the notification message carries the address of the proxy node device. The notification message may be an extension of an open shortest path first (Open Shortest Path First, OSPF) link state advertisement (Link State Advertisement, LSA) message, and specifically, the address of the proxy node device is carried by extending a type-length value (Type Length Value, TLV) in the LSA message. An example is given where the address of the proxy node device carried by the TLV is an IPv4 address, referring to FIG. 6 for the extended TLV, in which:

a type (Type) field is used to identify that the LSA message carries the address of the proxy node device;

a length (Length) field is used to identify a data length of the TLV;

an IPv4 address (IPv4 address) filed is used to carry the address of the proxy node device.

Optionally, the label forwarding table established by the entry node device further includes: a corresponding relationship between the first label and the address of the proxy node device, a corresponding relationship between the label and the address of the destination node device. When a destination address of a packet received by the entry node device is the address of the destination node device, the packet is sent to the proxy node device via the first LSP according to the corresponding relationship between the label and the address of the destination node device in the label forwarding table, and the proxy node device then sends the packet to the destination node device according to the second LSP.

Optionally, the second LSP may be a BGP LSP or an RSVP TE LSP.

Optionally, the entry node device may also receive an indication message sent by the proxy node device, which includes an indicator of successful stitching the first LSP with the second LSP, where the indication message includes a type-length value (Type Length Value, TLV) of the indicator, the indicator TLV carries the indicator. When determining, through the indicator, that the first LSP and the second LSP are stitched successfully, the entry node device uses the third LSP to bear a service packet sent to the destination node device, and when determining, through the indicator, that the first LSP and the second LSP fail to be stitched, the entry node device prohibits using the third LSP to bear the service packet sent to the destination node device.

Through the indicator, a problem of loss of the service packet, which is caused by that the entry node device still continues to use the third LSP to bear a service packet sent to the destination network device when the first LSP and the second LSP fail to be stitched, may be avoided.

Optionally, referring to FIG. 7, after step 103, may also include:

701, the entry node device detects whether it is possible to reach the destination node device via the third LSP, if it is possible to reach the destination node device via the third LSP, then perform step 702; if it is impossible to reach the destination node device via the third LSP, then perform step 703.

702, the entry node device uses the third LSP to bear a service packet sent to the destination node device.

703, the entry node device prohibits the third LSP from bearing the service packet sent to the destination node device.

The detection of whether it is possible to reach the destination node device via the third LSP may be performed when the first LSP and the second LSP are stitched for the first time, and may also be performed when a stitching state of the first LSP and the second LSP changes for the first time subsequently.

Optionally, the detection may be implemented through an LSP packet internet groper (Packet Internet Groper, Ping).

Through technical solutions in embodiments of the present invention, the entry node device receives the label mapping message carrying the address of the destination node device and the address of the proxy node device, and establishes the first LSP according to the address of the proxy node device, the proxy node device stitches the first LSP with a second LSP to form the third LSP from the entry node device to the destination node device; during this process, there is no need for the entry node device and the intermediate node device to pre-configure a static route reaching the destination node device, which solves problems of complicated configuration as well as difficult management and maintenance due to a need to configure the static route when LSPs of different protocols are stitched in the prior art.

Figure 8:
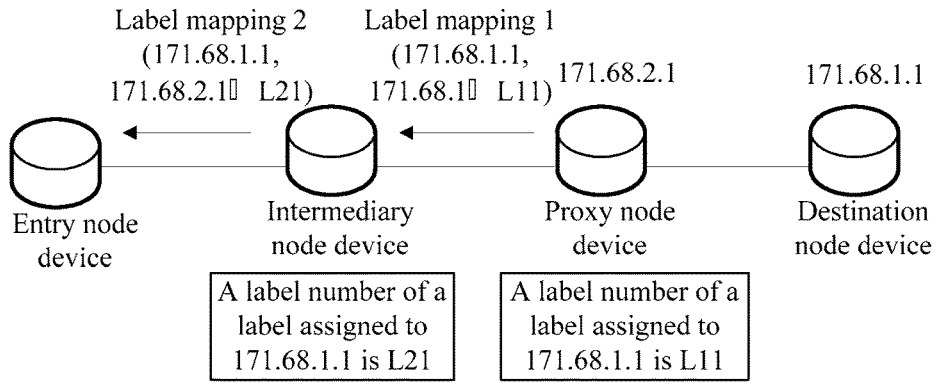
FIG. 8 is a schematic diagram of a network structure provided by an embodiment of the present invention.
Figure 9:
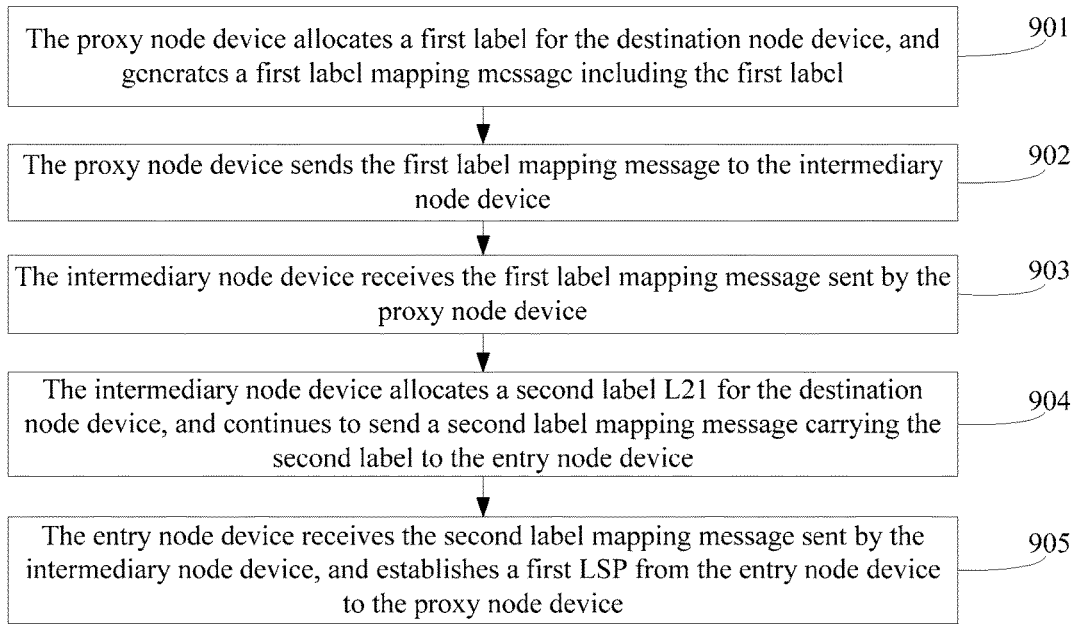
FIG. 9 is a flow chart of a fourth method for establishing an LSP provided by an embodiment of the present invention.

In order to explain the method for establishing an LSP provided in the above embodiments more clearly, an example of the method for establishing an LSP is described in details with reference to contents of the above embodiments. Referring to FIG. 8, a proxy node device and a destination node device are located in an IP backbone network, an entry node device and an intermediary node device are located in an access network of an IP RAN, the proxy node may be a carrier switch (Carrier Switch, CX) device, the entry node and the intermediary node may be an augmented transition network (Augmented Transition Network, ATN) device, an address of the destination node device is 171.68.1.1, and an address of the proxy node device is 171.68.2.1. Referring to FIG. 9, a flow of the method for establishing an LSP is specifically as follow:

901, the proxy node device allocates a first label for the destination node device, and generates a first label mapping message including the first label.

The proxy node device allocates a first label L11 for the destination node device, generates a first label forwarding table according to the first label, where the first label forwarding table includes: an entry label and the address of the destination node device, where the entry label is the first label L11. The proxy node device establishes a second LSP with the destination node device in advance, the second LSP may be a BGP LSP, the first label forwarding table also includes an exit label L01, the exit label L01 is an exit label corresponding to the second LSP and is allocated by a downstream node of the proxy node device for the destination node device when the second LSP is established.

The first label forwarding table is as shown in Table 1.

TABLE 1

| Address of destination node device | Entry label | Exit label |
| --- | --- | --- |
| 171.68.1.1 | L11 | L01 |

The first label mapping message also includes: the address of the destination node device and the address of the proxy node device.

For instance, in FIG. 8, the first label mapping message generated by the proxy node device is a label mapping message 1, where, the label mapping message 1 includes the first label L11, the address of the destination node device 171.68.1.1 and the address of the proxy node device 171.68.2.1.

902, the proxy node device sends the first label mapping message to the intermediary node device.

903, the intermediary node device receives the first label mapping message sent by the proxy node device.

904, the intermediary node device allocates a second label L21 for the destination node device, and continues to send a second label mapping message carrying the second label to the entry node device.

When allocating the second label for the destination node device, the intermediary node device allocates the second label for the destination node device via the address of the proxy node device, which specifically includes: using the address of the proxy node device to match a routing table, allocating the second label when a route reaching the proxy node device is matched, and establishing a second label forwarding table corresponding to the second label, where the second label forwarding table includes: the address of the proxy node device, the address of the destination node device, an entry label, an exit label and a next hop, where, the entry label is the second label L21, the exit label is the first label L11, the next hop is the proxy node device. The second label forwarding table is as shown in Table 2.

TABLE 2

| Address of destination node device and address of proxy node device | Entry label | Exit label | Next hop |
| --- | --- | --- | --- |
| 171.68.1.1<br>171.68.2.1 | L21 | L11 | Proxy node device |

The second label mapping message also carries the address of the destination node device and the address of the proxy node device, as shown in FIG. 8, the second label mapping message generated by the intermediary node device is a label mapping message 2, where, the label mapping message 2 includes the second label L21, the address of the destination node device 171.68.1.1 and the address of the proxy node device 171.68.2.1.

905, the entry node device receives the second label mapping message sent by the intermediary node device, and establishes a first LSP from the entry node device to the proxy node device.

The entry node device matches a routing table according to the address of the proxy node device carried by the second label mapping message, establishes a third label forwarding table when a route reaching the proxy node device is matched, where the third label forwarding table includes: a corresponding relationship between the second label and the address of the proxy node device and a corresponding relationship between the second label and the address of the destination node device, and specifically, the third label forwarding table includes: the second label L21, the address of the proxy node device, the address of the destination node device and a next hop. The third label forwarding table is as shown in Table 3.

TABLE 3

| Address of destination node device and address of proxy node device | Entry label | Exit label | Next hop |
| --- | --- | --- | --- |
| 171.68.1.1<br>171.68.2.1 | NULL (invalid label) | L21 | Intermediary node device |

After the entry node device establishes the third label forwarding table, establishment of the first LSP is then completed. Since the proxy node device has established the first label forwarding table, that is, the first LSP and the second LSP are stitched, a third LSP from the entry node device to the destination node device is established. When receiving a packet with a destination address being the address of the destination node device, the entry node device sends the packet to the proxy node device via the first LSP according to the corresponding relationship between the second label and the address of the destination node device in the third label forwarding table, and the proxy node device sends the packet to the destination node device via the second LSP according to the first label forwarding table. Consequently, it may be achieved that, the entry node device and the intermediary node device can still establish the third LSP from the entry node device to the destination node device without saving a routing table for reaching the destination node device.

The proxy node device stitching the first LSP with a second LSP, specifically is: when the first LSP is established, the proxy node device allocates a first label for an upstream node of the proxy node device and the proxy node device establishes the first label forwarding table and then the stitching of the first LSP and the second LSP is achieved; when receiving a packet with an entry label being the first label, the proxy node device replaces the first label of the packet with the exit label L01 according to the first label forwarding table, and then sends the packet to the destination node device via the second LSP. The entry node device and the intermediary node device do not need to pre-configure a static route reaching the destination node device, which helps to save memories of the entry node device and the intermediary node device, and reduce complexity of maintenance and management, and which helps to realize an integration of an access network of an IP RAN and an IP backbone network.

Figure 10:
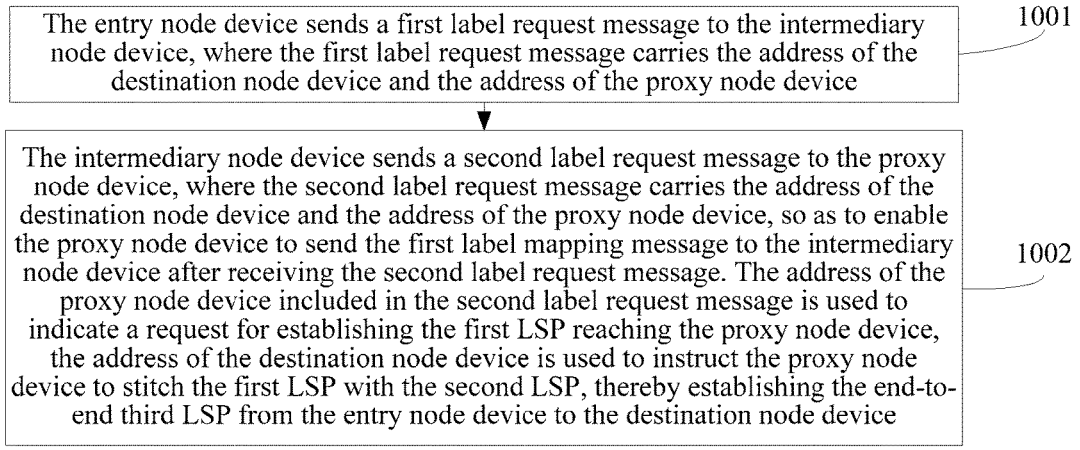
FIG. 10 is a flow chart of a method for sending a label request message provided by an embodiment of the present invention.

Referring to FIG. 10, before step 901 further includes:

1001, the entry node device sends a first label request message to the intermediary node device, where the first label request message carries the address of the destination node device and the address of the proxy node device.

1002, the intermediary node device sends a second label request message to the proxy node device, where the second label request message carries the address of the destination node device and the address of the proxy node device, so as to enable the proxy node device to send the first label mapping message to the intermediary node device after receiving the second label request message. The address of the proxy node device included in the second label request message is used to indicate a request for establishing the first LSP reaching the proxy node device, the address of the destination node device is used to instruct the proxy node device to stitch the first LSP with the second LSP, thereby establishing the third LSP from the entry node device to the destination node device.

After receiving the first label request message, the intermediary node device matches a routing table according to the address of the proxy node device carried in the first label request message, and sends the second label request message to the proxy node device according to a matching route reaching the proxy node device.

Figure 11:
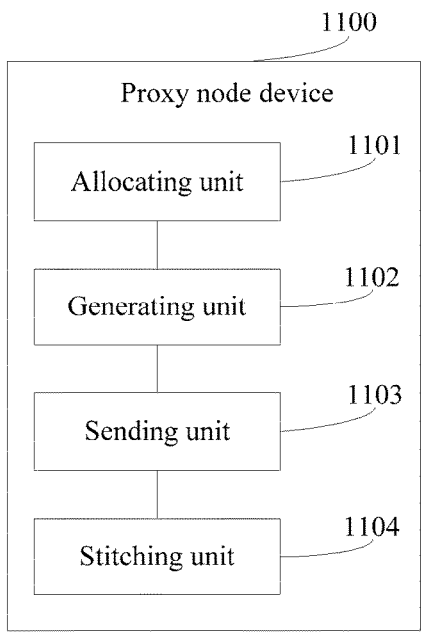
FIG. 11 is a schematic structural diagram of a first proxy node device provided by an embodiment of the present invention.

Referring to FIG. 11, another embodiment of the present invention provides a proxy node device 1100, and the proxy node device 1100 is configured to perform a function performed by the proxy node device in the method for establishing an LSP as shown in FIG. 1. The proxy node device 1100 includes:

an allocating unit 1101, configured to allocate a first label for a destination node device;

a generating unit 1102, configured to generate a first label mapping message, where the first label mapping message carries the first label, an address of the destination node device and an address of the proxy node device 1100;

a sending unit 1103, configured to send the first label mapping message to an upstream node device of the proxy node device 1100 to initiate establishment of a first LSP from an entry node device to the proxy node device 1100; and an stitching unit 1104, configured to stitch the first LSP with a second LSP to form a third LSP from the entry node device to the destination node device, where the second LSP is an LSP established between the proxy node device 1100 and the destination node device, and the first LSP and the second LSP are LSPs of different protocol types.

Figure 12:
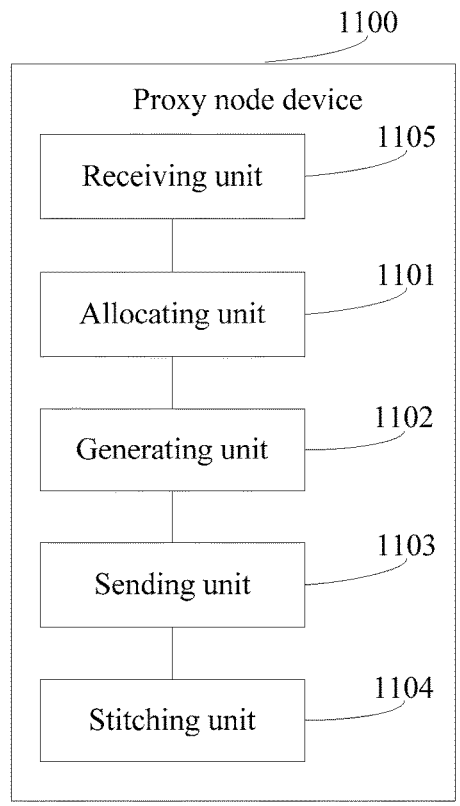
FIG. 12 is a schematic structural diagram of a second proxy node device provided by an embodiment of the present invention.

Referring to FIG. 12, the proxy node device 1100 also includes:

a receiving unit 1105, configured to receive a label request message sent by the upstream node before allocating the first label for the destination node device, where the label request message carries the address of the destination node device and the address of the proxy node device 1100.

Through the proxy node device 1100 provided by the embodiment of the present invention, the proxy node device 1100 generates the first label mapping message to initiate establishment of a first LSP from the entry node device to the proxy node device 1100, where the first label mapping message includes the address of the destination node device and the address of the proxy node device 1100, in this way, an intermediary node device between the proxy node device 1100 and the entry node device may establish the first LSP via the address of the proxy node device 1100, the proxy node device 1100 stitches the first LSP with a second LSP to form the third LSP from the entry node device to the destination node device, during this process, there is no need for the entry node device and the intermediate node device to pre-configure a static route reaching the destination node device, which solves problems of complicated configuration as well as difficult management and maintenance due to a need to configure the static route when LSPs of different protocols are stitched in the prior art.

Figure 13:
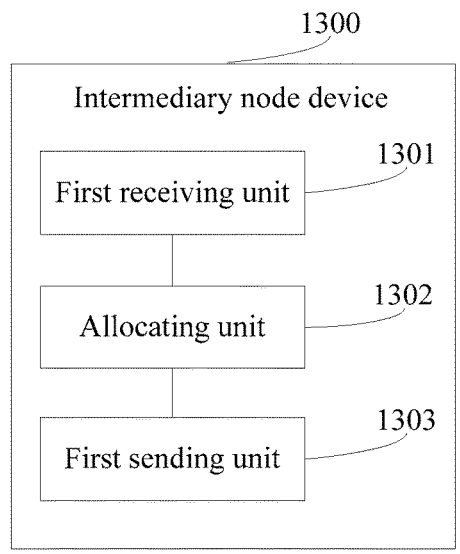
FIG. 13 is a schematic structural diagram of a first intermediary node device provided by an embodiment of the present invention.

Referring to FIG. 13, another embodiment of the present invention provides an intermediary node device 1300, the intermediary node device 1300 is configured to perform a function performed by the intermediary node device in the method for establishing an LSP as shown in FIG. 4, and the intermediary node device includes:

a first receiving unit 1301, configured to receive a first label mapping message sent by a downstream node device of the intermediary node device 1300, where the first label mapping message carries a first label allocated by the downstream node device for a destination node device, an address of the destination node device and an address of a proxy node device, and the first label mapping message is generated by the downstream node device after the proxy node device initiates establishment of a first LSP from an entry node device to the proxy node device;

an allocating unit 1302, configured to allocate a second label for the destination node device; and a first sending unit 1303, configured to send a second label mapping message to an upstream node device of the intermediary node device 1300, where the second label mapping message carries the second label, the address of the destination node device and the address of the proxy node device.

Figure 14:
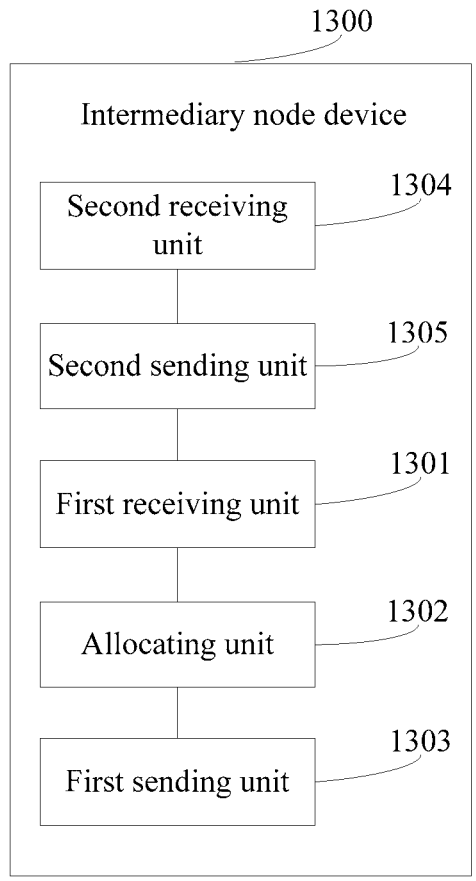
FIG. 14 is a schematic structural diagram of a second intermediary node device provided by an embodiment of the present invention.

Referring to FIG. 14, the intermediary node device 1300 also includes:

a second receiving unit 1304, configured to receive a first label request message sent by the upstream node device of the intermediary node device 1300 before receiving the first label mapping message sent by the downstream node device of the intermediary node device, where the first label request message carries the address of the destination node device and the address of the proxy node device; and a second sending unit 1305, configured to send a second label request message to the downstream node device of the intermediary node device 1300, where the second label request message carries the address of the destination node device and the address of the proxy node device.

According to the intermediary node device 1300 provided in the embodiment of the present invention, the intermediary node device 1300 receives the first label mapping message carrying the address of the destination node device and the address of the proxy node device, and sends the second label mapping message including the address of the destination node device and the address of the proxy node device to the upstream node device of the intermediary node device 1300, so as to trigger the entry node device to establish the first LSP according to the address of the proxy node device, the proxy node device stitches the first LSP with a second LSP to form the third LSP from the entry node device to the destination node device, during this process, there is no need for the entry node device and the intermediate node device to pre-configure a static route reaching the destination node device, which solves problems in the prior art that configuration is complicated and management and maintenance are difficult due to a need to configure the static route when LSPs of different protocols are stitched.

Figure 15:
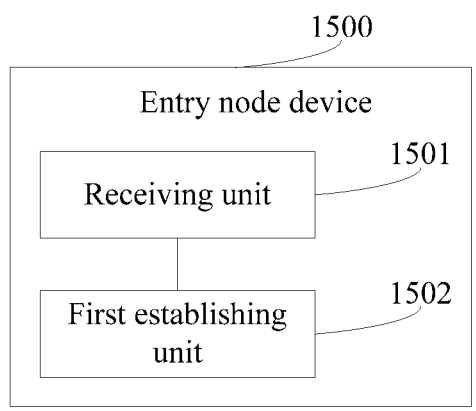
FIG. 15 is a schematic structural diagram of a first entry node device provided by an embodiment of the present invention.

Referring to FIG. 15, another embodiment of the present invention provides an entry node device 1500, the entry device is configured to perform a function performed by the entry node device 1500 in the method for establishing an LSP provided in the above embodiments, and the entry node device 1500 includes:

a receiving unit 1501, configured to receive a first label mapping message sent by a downstream node device of the entry node device 1500, where the first label mapping message carries a first label allocated by the downstream node device for a destination node device, an address of a proxy node device and an address of the destination node device, and the first label mapping message is generated by the downstream node device after the proxy node device initiates establishment of a first LSP from the entry node device 1500 to the proxy node device; and a first establishing unit 1502, configured to establish the first LSP from the entry node device 1500 to the proxy node device according to the address of the proxy node device, and establish a label forwarding table, where the label forwarding table includes the label, the address of the proxy node device and the address of the destination node device.

Figure 16:
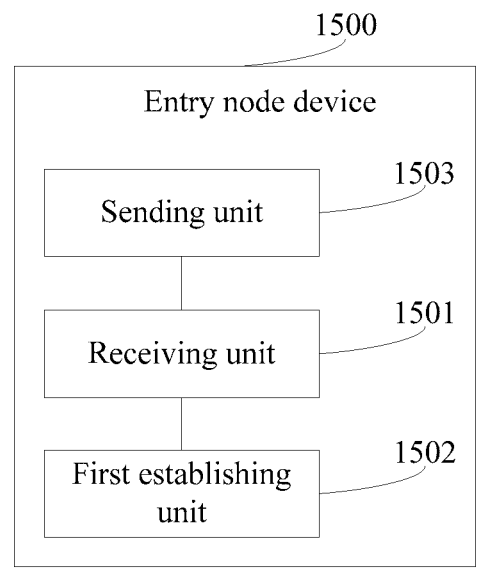
FIG. 16 is a schematic structural diagram of a second entry node device provided by an embodiment of the present invention.

Referring to FIG. 16, the entry node device 1500 also includes:

a sending unit 1503, configured to send a label request message to the downstream node device before the label mapping message sent by the downstream node device of the entry node device is received, where the label request message carries the address of the destination node device and the address of the proxy node device.

According to the entry node device 1500 provided in the embodiment of the present invention, the entry node device 1500 receives the first label mapping message carrying the address of the destination node device and the address of the proxy node device, and establishes the first LSP according to the address of the proxy node device, the proxy node device stitches the first LSP with a second LSP to form the third LSP from the entry node device 1500 to the destination node device, during this process, there is no need for the entry node device and the intermediate node device to pre-configure a static route reaching the destination node device, which solves problems in the prior art that configuration is complicated and management and maintenance are difficult due to a need to configure the static route when LSPs of different protocols are stitched.

Figure 17:
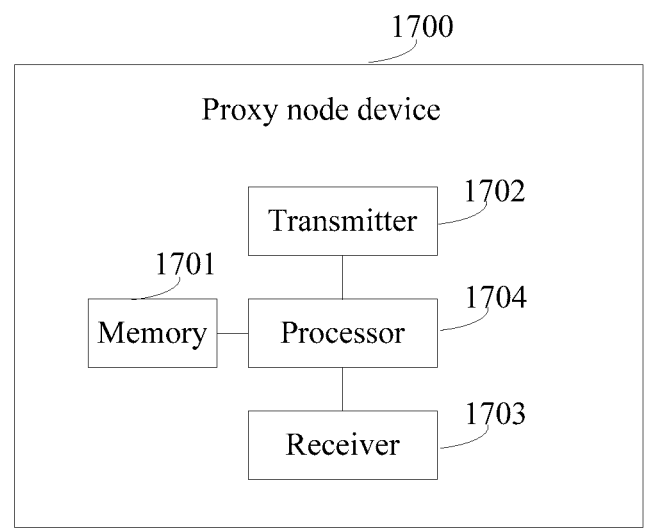
FIG. 17 is a schematic structural diagram of a proxy node device provided by an embodiment of the present invention.

Another embodiment of the present invention provides a proxy node device 1700, referring to FIG. 17, the proxy node device 1700 includes: a memory 1701, a transmitter 1702, a receiver 1703, and a processor 1704 connected to the memory 1701, the transmitter 1702 and the receiver 1703 respectively, the memory 1701 is configured to store a set of program codes, and the processor 1704 is configured to invoke a program stored by the memory 1701 to perform the following operations:

allocating a first label for a destination node device, and generating a first label mapping message, where the first label mapping message carries the first label, an address of the destination node device and an address of the proxy node device 1700;

triggering the transmitter 1702 to send the first label mapping message to an upstream node device of the proxy node device 1700, and initiating establishing a first LSP from an entry node device to the proxy node device 1700;

stitching the first LSP with a second LSP to form a third LSP from the entry node device to the destination node device, where the second LSP is an LSP established between the proxy node device 1700 and the destination node device, and the first LSP and the second LSP are LSPs of different protocol types.

Optionally, the processor 1704 invokes a program stored by the memory 1701 to perform the following operations:

triggering the receiver 1703 to receive a label request message sent by the upstream node, where the label request message carries the address of the destination node device and the address of the proxy node device.

Optionally, the label mapping message further carries a topology identification ID to enable the first LSP to be established in a network topology corresponding to the topology ID.

Optionally, the first label mapping message is a label distribution protocol LDP label mapping message, the address of the destination node device and the address of the proxy node device are carried by extending a prefix forwarding equivalence class element Prefix FEC Element of the first label mapping message.

Figure 18:
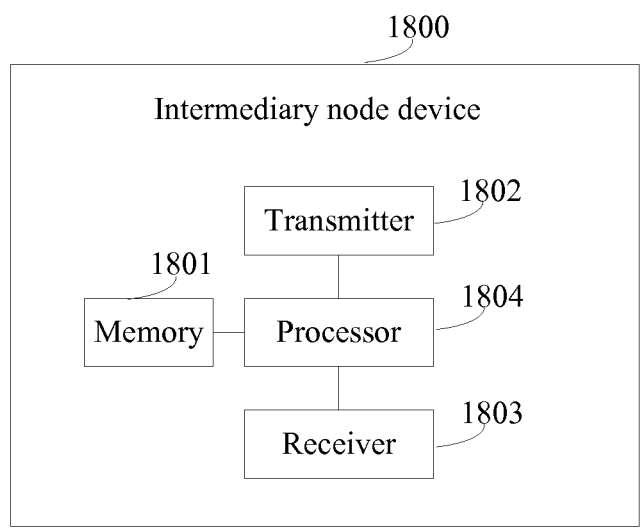
FIG. 18 is a schematic structural diagram of an intermediary node device provided by an embodiment of the present invention.

Another embodiment of the present invention provides an intermediary node device 1800, referring to FIG. 18, the intermediary node device 1800 includes: a memory 1801, a transmitter 1802, a receiver 1803, and a processor 1804 connected to the memory 1801, the transmitter 1802 and the receiver 1803 respectively, the memory 1801 is configured to store a set of program codes, and the processor 1804 is configured to invoke a program in the memory 1801 to perform the following operations:

triggering the receiver 1803 to receive a first label mapping message sent by a downstream node device of the intermediary node device, where the first label mapping message carries a first label allocated by the downstream node device for a destination node device, an address of the destination node device and an address of a proxy node device, and the first label mapping message is generated by the downstream node device after the proxy node device initiates establishment of a first LSP from an entry node device to the proxy node device;

allocating a second label for the destination node device; and triggering the transmitter 1802 to send a second label mapping message to an upstream node device of the intermediary node device 1800, where the second label mapping message carries the second label, the address of the destination node device and the address of the proxy node device.

Optionally, the processor 1804 is also configured to invoke the program codes stored by the memory 1801 to perform the following operations:

triggering the receiver 1803 to receive a first label request message sent by the upstream node device of the intermediary node device 1800, where the first label request message carries the address of the destination node device and the address of the proxy node device;

sending a second label request message to the downstream node device of the intermediary node device 1800, where the second label request message carries the address of the destination node device and the address of the proxy node device.

Figure 19:
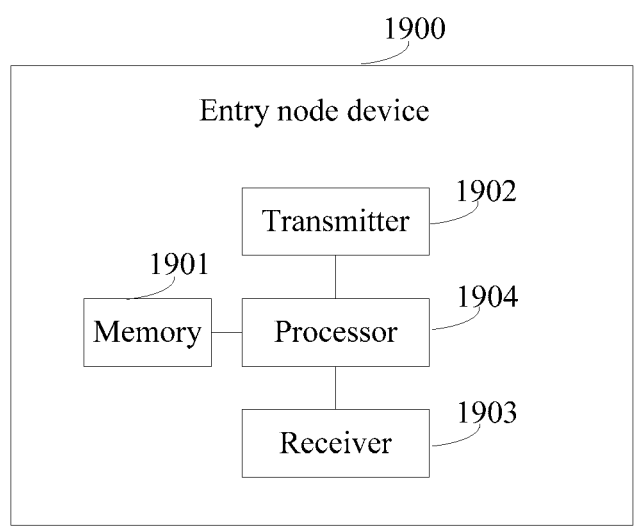
FIG. 19 is a schematic structural diagram of an entry node device provided by an embodiment of the present invention.

Another embodiment of the present invention provides an entry node device 1900, referring to FIG. 19, the entry node device 1900 includes: a memory 1901, a transmitter 1902, a receiver 1903, and a processor 1904 connected to the memory 1901, the transmitter 1902 and the receiver 1903 respectively, the memory 1901 is configured to store a set of program codes, and the processor 1904 is configured to invoke a program stored by the memory 1901 to perform the following operations:

triggering the receiver 1903 to receive a label mapping message sent by a downstream node device of the entry node device 1900, where the label mapping message carries a label allocated by the downstream node device for a destination node device, an address of a proxy node device and an address of the destination node device, and the label mapping message is generated by the downstream node device after the proxy node device initiates establishment of an LSP from the entry node device 1900 to the proxy node device;

establishing the LSP from the entry node device 1900 to the proxy node device according to the address of the proxy node device, and establishing a label forwarding table, where the label forwarding table includes the label, the address of the proxy node device and the address of the destination node device;

triggering the transmitter 1902 to send a label request message to the downstream node device, where the label request message carries the address of the destination node device and the address of the proxy node device.

In summary, through an entry node device 1900 provided in the embodiment of the present invention, the entry node device 1900 receives the label mapping message carrying the address of the destination node device and the address of the proxy node device, and establishes the first LSP according to the address of the proxy node device, the proxy node device stitches the first LSP with a second LSP to form the third LSP from the entry node device 1900 to the destination node device, during this process, there is no need for the entry node device 1900 and the intermediate node device to pre-configure a static route reaching the destination node device, which solves problems of complicated configuration as well as difficult management and maintenance due to a need to configure the static route when LSPs of different protocols are stitched in the prior art.

Figure 20:
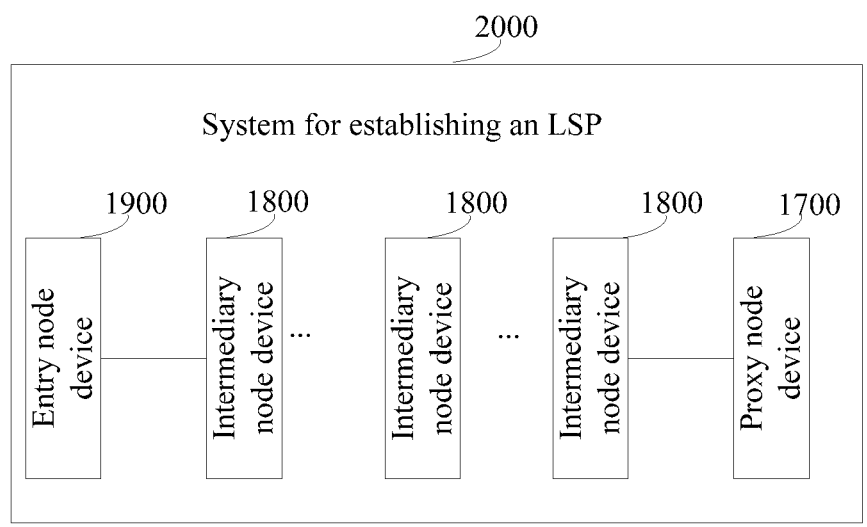
FIG. 20 is a schematic structural diagram of a system for establishing an LSP provided by an embodiment of the present invention.

Referring to FIG. 20, another embodiment of the present invention provides a system 2000 for establishing an LSP, the system 2000 for establishing the LSP includes: a proxy node device 1700, an intermediary node device 1800 and an entry node device 1900:

the proxy node device 1700 is configured to allocate a first label for a destination node device, and generate a first label mapping message including the first label, send the first label mapping message to the intermediary node device 1800 to initiate establishment of a first LSP from the entry node device 1900 to the proxy node device 1700, where the first label mapping message also includes an address of the destination node device and an address of the proxy node device 1700;

the intermediary node device 1800 is configured to receive the first label mapping message, and allocate a second label according to the address of the proxy node device 1700, and send a second label mapping message including the second label, the address of the destination node device and the address of the proxy node device 1700 to the entry node device 1900;

the entry node device 1900 is configured to receive the second label mapping message, and establish the first LSP according to the address of the proxy node device 1700;

the proxy node device 1700 is further configured to stitch the first LSP with a second LSP to form a third LSP from the entry node device 1900 to the destination node device, where the second LSP is an LSP established between the proxy node device 1700 and the destination node device, and the first LSP and the second LSP are LSPs of different protocol types.

The entry node device 1900 is further configured to send a first label request message to the intermediary node device 1800 before the proxy node device 1700 sends the first label mapping message to the intermediary node device 1800, where the label request message carries the address of the destination node device and the address of the proxy node device 1700;

The intermediary node device 1800 is further configured to receive the first label request message sent by the entry node device 1900, and send a second label request message to the destination node device, where the second label request message carries the address of the proxy node device 1700 and the address of the destination node device;

The proxy node device 1700 is further configured to receive the second label request message sent by the intermediary node device 1800.

In conclusion, in a system provided in this embodiment, the proxy node device 1700 allocates a first label for a destination node device, and generates a first label mapping message including the first label to initiate establishment of a first LSP from the entry node device 1900 to the proxy node device 1700, where the first label mapping message also includes an address of the destination node device and an address of the proxy node device 1700, in this way, an intermediary node device 1800 between the proxy node device 1700 and the entry node device 1900 may establish the first LSP via the address of the proxy node device 1700, the proxy node device 1700 stitches the first LSP with a second LSP to form the third LSP from the entry node device 1900 to the destination node device, during this process, there is no need for the entry node device 1900 and the intermediate node device 1800 to pre-configure a static route reaching the destination node device, which solves problems of complicated configuration as well as difficult management and maintenance due to a need to configure the static route when LSPs of different protocols are stitched in the prior art.

It should be noted that, when implementing establishment of an LSP by a proxy node device, an intermediary node device and an entry node device provided in the above embodiments, division of the above functional modules is only an example for description, during a practical application, the above functions may be assigned to different function modules to be completed according to a need, that is, internal structures of the proxy node device, the intermediary node device and the entry node device are divided into different function modules so as to complete all or a part of functions described above. In addition, the proxy node device, the intermediary node device and the entry node device provided in the above embodiments as well as embodiments of a method for establishing an LSP belong to a same conception, for a specific implementation procedure thereof, reference may be made to the method embodiments, which will not be repeated herein.

The word of "first" in first LSP, first label, first label mapping table and first label request message as described in the embodiments of the present invention is only used as a name identification, and does not represent the first in order. This rule also applies to "second" and "third".

Persons of ordinary skill in the art may understand that, all or a part of steps of the foregoing method embodiments may be implemented by a program instructing relevant hardware. The foregoing program may be stored in a computer readable storage medium. When the program is executed, the steps of the foregoing method embodiments are performed. The foregoing storage medium may be at least one of the following mediums: various mediums capable of storing program codes, such as a read-only memory (Read-Only Memory, short for ROM), an RAM, a magnetic disk, or an optical disc.

Finally, it should be noted that the foregoing embodiments are merely intended for describing technical solutions of the present invention rather than limiting the present invention. Although the present invention and beneficial effects the present invention brings out are described in detail with reference to the foregoing embodiments, persons of ordinary skill in the art should understand that they may still make modifications to the technical solutions described in the foregoing embodiments, or make equivalent replacements to some technical features therein; however, these modifications or replacements do not make the essence of corresponding technical solutions depart from the scope of claims of the present invention.

What is claimed is:

1. A method for establishing a label switched path (LSP), the method comprising:
   allocating, by a proxy node, a first label for a destination node;
   generating, by the proxy node, a label mapping message, wherein the label mapping message carries the first label, an address of the destination node and an address of the proxy node;
   sending, by the proxy node, the label mapping message to an upstream node of the proxy node to initiate establishment of a first LSP from an entry node to the proxy node;
   during the establishment of the first LSP, using a routing table at the upstream node to match the address of the proxy node allocating a second label for the destination node when a route is matched that reaches the proxy node; and
   stitching, by the proxy node, the first LSP with a second LSP to form a third LSP from the entry node to the destination node, wherein the second LSP is an LSP established between the proxy node and the destination node, and wherein the first LSP and the second LSP are LSPs of different protocol types.

2. The method according to claim 1, further comprising:
   receiving a label request message sent by the upstream node, wherein the label request message carries the address of the destination node and the address of the proxy node, and wherein the receiving is performed before the allocating.

3. The method according to claim 1, wherein the label mapping message further carries a topology identification (ID) that enables the first LSP to be established in a network topology corresponding to the topology ID.

4. The method according to claim 1, wherein the label mapping message is a label distribution protocol (LDP) label mapping message, and wherein the address of the destination node and the address of the proxy node are carried by extending a prefix forwarding equivalence class element (Prefix FEC Element) of the label mapping message.

5. The method according to claim 1, wherein the allocating comprises:
   matching, by the proxy node, a routing table according to the address of the destination node, and
   allocating the first label when a route reaching the destination node is matched.

6. A method for establishing a label switched path (LSP), wherein the method comprises:
   receiving, by an entry node, a label mapping message sent by a downstream node of the entry node, wherein (a) the label mapping message carries a label allocated by the downstream node for a destination node, an address of a proxy node and an address of the destination node, (b) the label is allocated by the downstream node when a routing table at the downstream node matches the address of the proxy node and a route reaching the proxy node, and (c) wherein the label mapping message is generated by the downstream node after the proxy node initiates establishment of an LSP from the entry node to the proxy node; and
   establishing, by the entry node, the LSP from the entry node to the proxy node according to the address of the proxy node, and
   establishing a label forwarding table, wherein the label forwarding table comprises: the label, the address of the proxy node and the address of the destination node.

7. The method according to claim 6, further comprising:
   sending, by the entry node, a label request message to the downstream node, wherein the label request message carries the address of the destination node and the address of the proxy node, and wherein the sending is performed is performed before the receiving.

8. The method according to claim 6, wherein the label mapping message is a label distribution protocol (LDP) label mapping message, and wherein the address of the destination node and the address of the proxy node are carried by extending a prefix forwarding equivalence class element (Prefix FEC Element) of the label mapping message.

9. The method according to claim 6, wherein the label request message is a label distribution protocol (LDP) label request message, and wherein the address of the destination node and the address of the proxy node are carried by extending a Prefix FEC Element of the label request message.

10. The method according to claim 6, wherein the label mapping message further carries a topology identification (ID) that enables the first LSP to be established in a network topology corresponding to the topology ID.

11. A proxy node for establishing a label switched path (LSP), the proxy node comprising:
    a processor and memory storing instructions for execution by the processor such that when executed the processor is configured to
    allocate a first label for a destination node; and
    generate a label mapping message, wherein the label mapping message carries the first label, an address of the destination node and an address of the proxy node;
    a transmitter configured to send the label mapping message to an upstream node device of the proxy node to initiate establishment of a first LSP from an entry node to the proxy node; and
    the processor is further configured to stitch the first LSP with a second LSP to form a third LSP from the entry node to the destination node, wherein the second LSP is an LSP established between the proxy node and the destination node, and wherein the first LSP and the second LSP are LSPs of different protocol types,
    wherein during the establishment of the first LSP, the upstream node uses a routing table to match the address of the proxy node and a route reaching the proxy node from the upstream node, and allocates a second label for the destination node when the route is matched.

12. The proxy node according to claim 11, further comprising:
    a receiver configured to receive a label request message sent by the upstream node before allocating the label for the destination node, wherein the label request message carries the address of the destination node and the address of the proxy node.

13. An intermediary node device for establishing a label switched path (LSP), the intermediary node comprising:
    a receiver configured to receive a first label mapping message sent by a downstream node of the intermediary node, wherein the first label mapping message carries a first label allocated by the downstream node for a destination node, an address of the destination node and an address of a proxy node, and wherein the first label mapping message is generated by the downstream node after the proxy node initiates establishment of a first LSP from an entry node to the proxy node;
    a processor configured to allocate a second label for the destination node when a routing table matches the address of the proxy node to a route reaching the proxy node from the intermediary node; and
    a transmitter configured to send a second label mapping message to an upstream node of the intermediary node, wherein the second label mapping message carries the second label, the address of the destination node and the address of the proxy node.

14. The intermediary node device according to claim 13, wherein:
    the receiver is further configured to receive a first label request message sent by the upstream node of the intermediary node before receiving the first label mapping message sent by the downstream node of the intermediary node, wherein the first label request message carries the address of the destination node and the address of the proxy node; and
    the transmitter is further configured to send a second label request message to the downstream node of the intermediary node, wherein the second label request message carries the address of the destination node and the address of the proxy node.

15. An entry node for establishing a label switched path (LSP), the entry node comprising:
    a receiver configured to receive a label mapping message sent by a downstream node of the entry node, wherein (a) the label mapping message carries a label allocated by the downstream node for a destination node, an address of a proxy node and an address of the destination node, (b) the label is allocated by the downstream node when a routing table at the downstream node matches the address of the proxy node to a route reaching the proxy node from the downstream node, and (c) the label mapping message is generated by the downstream node after the proxy node initiates establishment of an LSP from the entry node to the proxy node; and
    a processor configured to establish the LSP from the entry node to the proxy node according to the address of the proxy node, and establish a label forwarding table, wherein the label forwarding table comprises the label, the address of the proxy node and the address of the destination node.

16. The entry node according to claim 15, further comprising:
a transmitter configured to send a label request message to the downstream node before receiving the label mapping message sent by the downstream node device of the entry node, wherein the label request message carries the address of the destination node and the address of the proxy node.

17. A system for establishing a label switched path (LSP), the system comprising:
a proxy node;
an intermediary node; and
an entry node,
wherein, the proxy node is configured to allocate a first label for a destination node, and send a first label mapping message to the intermediary node to initiate establishment of a first LSP from the entry node to the proxy node, wherein the first label mapping message carries the first label, an address of the destination node and an address of the proxy node;
wherein, the intermediary node is configured to receive the first label mapping message match a routing table by using the address of the proxy node allocate a second label for the destination node when a route reaching the proxy node is matched and send a second label mapping message to the entry node, wherein the second label mapping message comprises the second label, the address of the destination node and the address of the proxy node to the entry node;
wherein, the entry node is configured to receive the second label mapping message sent by the intermediary node and establish the first LSP from the entry node to the proxy node according to the address of the proxy node, and establish a label forwarding table, wherein the label forwarding table comprises: the second label, the address of the proxy node and the address of the destination node; and
wherein, the proxy node is further configured to stitch the first LSP with a second LSP to form a third LSP from the entry node to the destination node, wherein the second LSP is an LSP established between the proxy node and the destination node, and wherein the first LSP and the second LSP are LSPs of different protocol types.

18. The system according to claim 17, wherein,
the entry node is further configured to send a first label request message to the intermediary node before the proxy node sends the first label mapping message to the intermediary node;
the intermediary node is further configured to receive the first label request message sent by the entry node, and send a second label request message to the destination node; and
the proxy node is further configured to receive the second label request message sent by the intermediary node, wherein the first label request message and the second label request message both carry the address of the proxy node and the address of the destination node.

* * * * *

UNITED STATES PATENT AND TRADEMARK OFFICE
CERTIFICATE OF CORRECTION

| | |
|---|---|
| PATENT NO. | : 9,813,332 B2 |
| APPLICATION NO. | : 14/859205 |
| DATED | : November 7, 2017 |
| INVENTOR(S) | : Zhenbin Li |

It is certified that error appears in the above-identified patent and that said Letters Patent is hereby corrected as shown below:

On the second page, in the third Non-Patent Literature, Line 7 the author "Andersoson" should read -- Andersson --.

Signed and Sealed this
Thirty-first Day of July, 2018

Andrei Iancu
*Director of the United States Patent and Trademark Office*